United States Patent
Jou et al.

(10) Patent No.: US 7,529,216 B2
(45) Date of Patent: May 5, 2009

(54) METHODS AND APPARATUS FOR BROADCAST TRAFFIC REDUCTION ON A WIRELESS TRANSPORT NETWORK

(75) Inventors: Tyan-Shu Jou, Cary, NC (US); Ted Tsei Kuo, Palo Alto, CA (US); Ming-Jye Sheu, San Jose, CA (US)

(73) Assignee: Accton Technology Corporation, Hsinchu (TW)

( * ) Notice: Subject to any disclaimer, the term of this patent is extended or adjusted under 35 U.S.C. 154(b) by 1030 days.

(21) Appl. No.: 10/915,627

(22) Filed: Aug. 10, 2004

(65) Prior Publication Data

US 2005/0036489 A1 Feb. 17, 2005

Related U.S. Application Data

(60) Provisional application No. 60/495,186, filed on Aug. 15, 2003.

(51) Int. Cl.
*H04W 4/00* (2009.01)
(52) U.S. Cl. .................. 370/338; 370/254; 709/201
(58) Field of Classification Search ........... 370/338, 370/254; 709/201
See application file for complete search history.

(56) References Cited

U.S. PATENT DOCUMENTS 5,752,003 A * 5/1998 Hart ........................ 709/223
5,926,463 A * 7/1999 Ahearn et al. ............. 370/254
6,041,166 A * 3/2000 Hart et al. ................. 709/238
6,269,404 B1 * 7/2001 Hart et al. ................. 709/238
6,611,525 B1 * 8/2003 Natanson et al. ...... 370/395.53
6,751,729 B1 * 6/2004 Giniger et al. ............ 713/153

* cited by examiner

*Primary Examiner*—Nay A Maung
*Assistant Examiner*—Richard Chan
(74) *Attorney, Agent, or Firm*—Thomas, Kayden, Horstemeyer & Risley

(57) ABSTRACT

The present invention discloses a wireless communication network comprising: at least one edge device coupled to a wired network; one or more wireless transport device coupled to the edge device via a wireless network; and at least one mobile device coupled to the wireless transport device via the wireless network. Wherein the wireless transport device carries an identify information of a neighboring device in a broadcast frames; and the identify information allowing the wireless transport device to determine to receive a broadcast frames from the neighboring device. The wireless transport device maintains and calculates a table that contains a list of couples of frame originator and the neighboring device the broadcast should come from. When the table includes the information of the neighboring device, the wireless transport device accepts the broadcast frames from the neighboring device while the table depicts the frame originated by the originator should come from the neighboring device. Otherwise, the wireless transport device drops the broadcast frames from the neighboring device.

24 Claims, 3 Drawing Sheets

```
2B 2B    6B         6B          6B       2B     6B       8B          14B
+--+--+----------+----------+----------+---+----------+--------+----------------+----
|  |  |Addr 1:RA|Addr 2:TA|Addr 3:DA|seq|Addr 4:SA|   LLC  | WITnet header|MSDU
+--+--+----------+----------+----------+---+----------+--------+----------------+----
```

| Originator | Receiving Neighbor |
|---|---|
| Device N1 | Device x |
| Device N2 | Device y |
| Device N3 | Device z |

METHODS AND APPARATUS FOR BROADCAST TRAFFIC REDUCTION ON A WIRELESS TRANSPORT NETWORK

The application claims the benefit of U.S. provisional application Ser. No. 60/495,186, filed on Aug. 15, 2003, which provisional application is hereby incorporated by reference.

FIELD OF THE INVENTION

The present invention relates to wireless communications systems, more particular, to a wireless network system that is capable of reducing the unnecessary broadcast frames to prevent frame looping and reducing total traffic amount to preserve network bandwidth.

BACKGROUND OF THE INVENTION

Typical wireless network systems comprise one or more access devices for communication purposes. The users may be communicated with the access device with personal computers or notebook computers via wireless means. Wireless local area networks (WLANs) were originally intended to allow wireless connections to a wired local area network (LAN), such as where premises wiring systems were nonexistent or inadequate to support conventional wired LANS. WLANs are often used to service mobile computing devices, such as laptop computers and personal digital assistants (PDAs). Typically, Access Points (APs) are set to ensure adequate radio coverage throughout the service area of the WLAN, while minimizing the costs associated with the installation of each AP. The APs must be configured to eliminate coverage gaps and to provide adequate coverage.

A wireless transport network is a network comprises a plurality of wirelessly connected devices that are responsible for relaying traffic for associated mobile clients. An example of a wireless transport network is a plurality of IEEE 802.11 capable devices that provide transport service for IEEE 802.11 or Bluetooth capable clients such as laptop computers, PDA (personal digital assistant), and the like. The network can further comprise one or more connections to a wired network through one or multiple edge devices. The edge devices are equipped and capable of both wireless and wired communication. In a wireless transport network, efficient reduction of unnecessary broadcast traffic is critical. The wireless transmission medium (the air) by nature is shared, therefore broadcast is a convenient way of communication in wireless networks for there is no need to transmit multiple times for a multi-destined frame. Once an originator broadcasts a frame to all its neighboring devices, some, if not all, of its neighboring devices will have to relay the frame for other remote devices. For any device that is a neighbor of multiple devices that are responsible for relaying broadcast frames, it receives multiple copies of the same frame. One simple example is once a device sends out a broadcast frame, it immediately receives multiple copies of the identical frame if there are multiple neighboring devices perform relay function for the frame. Unless a filtering method is implemented on the devices, in the worst case one single broadcast frame may be duplicated in an exponential growth fashion and saturate the network and waste device processing time. In the worst case, these frames may loop around the network until the end of their lives.

There is a need to reduce the unnecessary broadcast frames to prevent frame looping, reduce total traffic amount hence preserve network bandwidth, and save device processing effort. Prior art techniques in saving bandwidth on wireless network include software algorithms to select relay nodes for broadcast traffic, and maintaining sequence numbers of frames originated from each device to discard duplicates. U.S. Pat. No. 5,570,366 describes a method to filter frames from a wired network to a wireless access point via configured protocol parameters. Please refer to U.S. Pat. No. 5,570,366 to Baker, et al., "Broadcast/multicast filtering by the bridge-based access point," filed on May 18, 1995. The patent disclosed a communication systems which include high speed wired local area networks (LANs) and low speed wireless LANs. Many broadcast or multicast messages are forwarded to the wireless LANs that are not required as the mobile terminals. The prior art provides a means and method for each access point maintains a table of parameters for each associated mobile terminal in the connected wireless LAN. The parameters in that table are compared to the parameters in message frames received by the access point (AP) and only those messages having parameters found in the table are put on the wireless LAN. The tables at each access point are maintained by moving table entries from access point to access point. The art disclosed a method to reduce the unnecessary broadcast frame for the AP.

The patent does not teach how to reduce the traffic within the wireless network which includes a plurality of wireless transport devices coupled to thereon.

Please refer to U.S. Pat. No. 6,549,786, R. Y. M. Cheung, "Method and apparatus for connecting a wireless LAN to a wired LAN," filed on May 25, 1998. The prior art provided a method and a means for providing internetworking services to wireless nodes. The invention provides for an internetworking node which can either directly relay a message from one wireless node to another wireless node, or forward such messages indirectly by first resending them to another such internetworking node which in turn resends the message to the other wireless node. Therefore, the Patent discloses a mechanism to set up a plurality of wireless nodes and a plurality of wired-wireless edge access points to form a local area network. The internetworking devices themselves can communicate through the wireless medium. Preferably, such internetworking devices are interconnected by means of a wired LAN. The internetworking edge access points are used to relay traffic for wireless nodes unless the source and destination pair can communicate with each other directly. The wireless nodes actively select which access point it should be associated with, and determines whether it needs an AP's help to send messages. This addresses only the client-access point architecture and covers only basic connectivity issues.

However, the patent also failed to disclose a method to filter unnecessary broadcast traffic among the wireless transport devices.

SUMMARY OF THE INVENTION

The purpose for the present invention is to provide a filtering function at the wireless transport device to protect the wireless bandwidth from heavy broadcast traffic on the wireless Local Area Network (LAN). A plurality of wireless transport devices are needed in the network.

The present invention, therefore, discloses a wireless communication network comprising: at least one edge device coupled to a wired network; one or more wireless transport devices coupled to the edge device via a wireless network; and at least one mobile device coupled to the wireless transport device via the wireless network. Wherein the wireless transport device carries in a broadcast frame the identify information of a transport device that the frame is originated or neighboring; and the identify information allowing the wireless transport device to determine to receive a broadcast frames through a neighboring device. The wireless transport device maintains and calculates a table that contains the neighboring device identity that a broadcast frame originated from a particular transport device should come from. A wireless transport device accepts a broadcast frame from a neighboring device if the table look-up using the frame originator results in the information of the neighboring device. Otherwise, the wireless transport device drops the broadcast frames relayed through the neighboring device.

The identify information of the device as part of the broadcast frames facilitates the filtering on the broadcast frames. In addition, the address information of a previous hop from where the broadcast frame comes into the transmitter of the frame is carried in the relayed broadcast frame. This mechanism helps to reduce the processing effort for broadcast frames. Only one of the at least one edge device enables to relay broadcast traffic across a wired and a wireless network among the at least one edge devices connecting the wireless network to the wired network. In one example, the identify information includes a name or an address. Wherein the broadcast frame maybe MAC frame, wherein a WITnet header is added inside a MAC header to carry the identify information. The WITnet adopts several innovative schemes to prevent the wireless transport devices from receiving and processing duplicate broadcast frames.

The present invention also provides a method of wireless communication, the method comprises a step of carrying a name or an address of an originating transport device or a neighbor device such as other wireless transport device or mobile device in a broadcast frame. The method allows a wireless transport device to determine to receive the broadcast frames from the originator or neighbor wireless transport device by the name or address. The aforementioned devices are coupled each other thereby constructing a segment of a wireless communication network. During the procedure of the determination procedure, the method further comprises the steps of allowing the wireless transport device to maintain and calculate a table that contains a list of neighboring device. The wireless transport device may accept the broadcast frames from the neighbor wireless transport device while the neighbor device is list on the table when relaying through the listed neighboring device. On the contrary, the device drops the broadcast frames while said originator wireless transport device is not the listed neighboring device.

In one example, the name or address of the originator wireless transport device could be as part of the broadcast frames to facilitate the filtering function. The method includes a step of adding address information of a previous hop from where the broadcast frame comes into a transmitted frame while relaying the broadcast frame. When the wireless transport device receives the broadcast frame with the previous hop field containing the address of the wireless transport device's own, the wireless transport device will ignore and drop the broadcast frame.

DETAILED DESCRIPTION OF THE PREFERRED EMBODIMENT

Figures 1, 2:
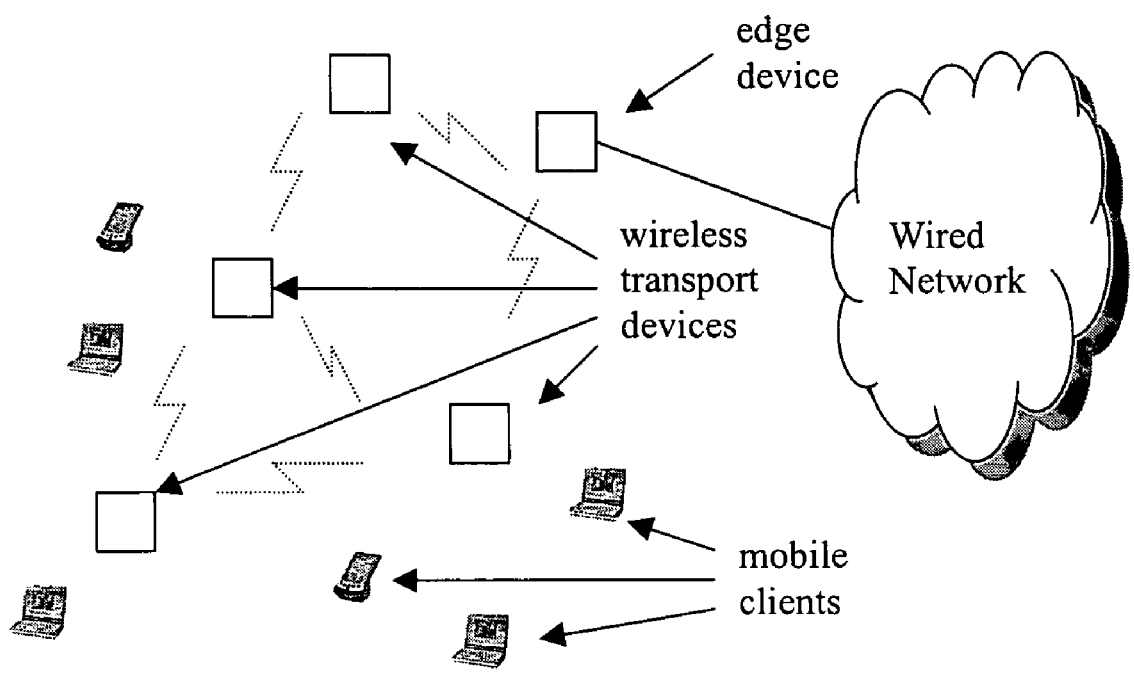
FIG. 1 illustrates an example of a wireless transport network.
FIG. 2 is an example of a broadcast receiving neighbor table.

FIG. 1 illustrates a communication network including at least one edge device. The wired LAN's could be joined by the edge device, bridges and access points or base stations (not shown). The present invention further includes a plurality of wireless transport devices coupled to the edge devices by wireless networking. The wireless transport devices are capable of relaying the broadcast frame on the wireless network. The edge devices are also equipped and capable of both wireless and wired communication. This arrangement can not be found in the prior art. Each edge device communicates with a wireless transport device, and the wireless transport devices communicate to the other neighbor device, such as one or more mobile terminals (clients) or other neighboring wireless transport devices. The present invention provides more efficient methods to filter unnecessary broadcast traffic and the techniques are more suitable to be implemented in firmware or hardware to enhance forwarding throughput. Please refer to FIG. 1, a wireless transport network includes a plurality of IEEE 802.11 capable devices that provide transport service for IEEE 802.11 or Bluetooth capable clients such as laptop computers, PDA (personal digital assistant) or the like. The network can further comprise one or more connections to a wired network through one or multiple edge devices.

As illustrated in FIG. 1, all of the wireless transport device may forward broadcast frame via wireless network to other mobile client or wireless transport device. The present invention is not directed to controlling the path of the transmission but is concerned with filtering unnecessary broadcast traffic on the wireless network. The wireless transport device includes a table with the information that contains the neighboring device from which a broadcast frame originated from a particular wireless transport device can be received. Therefore, a wireless network includes at least one edge device that coupled between wired LAN and wireless LAN. At least one wireless transport device is coupled to the edge device and the at least one mobile device via the wireless network.

Each wireless transport device according to the present invention could maintain and calculate a table that each entry (FIG. 2) contains the neighboring device from which a broadcast frame originated from a particular device can be received. For broadcast frames originated from a particular device, only the frames relayed through the listed neighboring device can be accepted. Broadcast frames coming through incorrect neighboring device are duplicates and should be ignored and dropped. The present invention may eliminate the distribution of an unnecessary and unfiltered broadcast packet over the communications network, thereby reducing the traffic of the wireless communication. In this situation, the broadcast frame is sent to predetermined wireless transport device, not every one wireless transport device or access point. The present invention provides a mechanism for ensuring that these broadcast messages are not received and duplicated in the same wireless transport device twice. To facilitate the above filtering function, the broadcast frames have to carry the name or address of the originator wireless transport device. Note the frame may have come from a client of the wireless transport device therefore it is not necessarily the real source of the frame.

Figure 3:
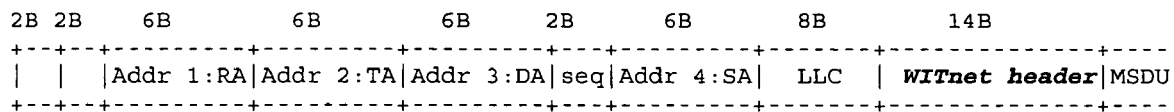
FIG. 3 shows an IEEE 802.11 MAC frame with a WITnet header inside

Depending on the method in unicast routing path calculation, the forwarding table for unicast frames can be used as the table that is used to look up the incoming neighboring device for a broadcast frame originator (i.e. FIG. 2). In this case, there is no extra effort in generating the broadcast frame reduction table. The other method to reduce the resource spending on broadcast frames is to reduce the processing effort for echoed broadcast frames. For example, a device X either sends or relays a broadcast frame to its neighbors N1 and N2. When N1 and N2 relay the frame, most likely device X will receive both the frames. Using the method mentioned earlier can cause the frames being dropped eventually. However, a table lookup for each frame will be needed for device X. To relieve the processing load, N1 and N2 can both add the address of X inside the frame. When X receives a broadcast frame, it can check whether the frame is echoed from itself. If so, the frame can be dropped immediately without processing. Therefore, to filter out echo frames, broadcast frames have to carry the address information of previous hop in the transmitted frame. This can be achieved by using an unused field in the 802.11 MAC header. In broadcasting, the Address 3 (DA, destination address) of FIG. 3 is not used. The "previous hop" information is carried in the location the Address 3 (DA, destination address).

The present invention therefore provides a method of wireless communication comprising a step of carrying a name or an address of an originator wireless transport device in a broadcast frames. The method allows a wireless transport device to determine to receive the broadcast frames from the originator wireless transport device by the name or address. During the procedure of the determination procedure, the method further comprises the steps of allowing the wireless transport device to maintain and calculate a table that contains a list of neighboring device. The wireless transport device may accept the broadcast frames from the originator wireless transport device while the originator wireless transport device relaying through the listed neighboring device. On the contrary, the device drops the broadcast frames while said originator wireless transport device is not the listed neighboring device.

In one example, the name or address of the originator wireless transport device could be as part of the broadcast frames to facilitate the filtering function. The method includes a step of adding address information of a previous hop from where the broadcast frame comes into a transmitted frame while relaying the broadcast frame. When the wireless transport device receives the broadcast frame with the previous hop field containing the address of the wireless transport device's own, the wireless transport device will ignore and drop the broadcast frame.

If a new client or wireless transport device are added in the network, the method of present invention will perform an act to update the information including the steps of embedding announcement information of a newly associated wireless client of a transport device into the broadcast frame. For the edge device, the present invention enables only one edge device of multiple edge devices to relay broadcast traffic across a wired and a wireless network among the multiple edge devices connecting the wireless network to the wired network.

Figure 4:
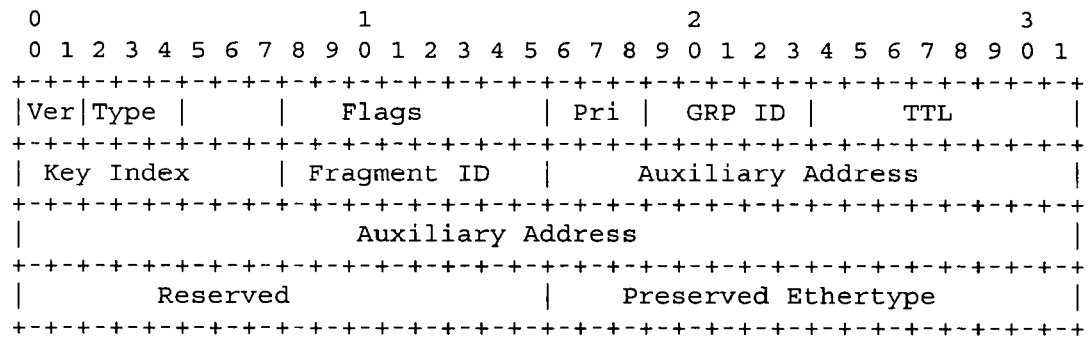
FIG. 4 shows the details of a WITnet header

The frame format is illustrated in FIGS. 3 and 4. FIG. 3 shows the format of an IEEE802.11 MAC (medium access control) frame as an example. The information communicated on the network is packaged into a frame which includes all required identify information as well as the data to be communicated. A first group of bytes provides frame RA (Receiver Address) information, which identifies the immediate recipient of the frame. A second group of bytes specifies the TA (Transmitter Address) information, which identifies the transmitter of the frame. The next two groups of bytes provide layer of DA and SA information. DA refers to the destination address. SA refers to Source Address as known in the art. The next group of bytes in the frame provides the protocol identifiers for the frame. For example, these frames might provide Logical Link Control (LLC) information. The next group of bytes defines the WITnet header. The next group of bytes defines the MSDU (MAC Service Data Unit) of the frame, which carries the information to be served by the transport network.

In a preferred embodiment, a broadcast frame in WITnet is a WDS frame with Receiver Address Field (please refer to FIG. 3) being, for instant, 0xffffffffffff. This frame can reach all one-hop away neighbors at once, save the effort of using multiple unicast frames. WITnet adopts several innovative schemes to prevent the transport devices from receiving and processing duplicate broadcast frames. As mentioned above, FIG. 3 is a format of an IEEE802.11 MAC frame as an example. Inside the MAC header, and extra "WITnet header" is added to carry the needed information for the transport device to perform its responsibility.

FIG. 4 shows the details of the "WITnet header." Inside the WITnet header, the 6-byte "Auxiliary Address" can be used to carry the needed information for the broadcast traffic reduction. A transport device at times needs to generate a broadcast frame onto the transport network, either because one of its clients did so, or the device has to perform a request coming from an application running on the transport device. In addition to the normal MAC layer operation, the device creates the WITnet header and then adds its own address into the "Auxiliary Address" field. When a transport device receives a broadcast frame, it uses the "Auxiliary Address" information to verify whether this frame is received through the correct neighbor for the originated from the device identified through the "Auxiliary Address". If it is not, the frame should be dropped.

Figure 5:
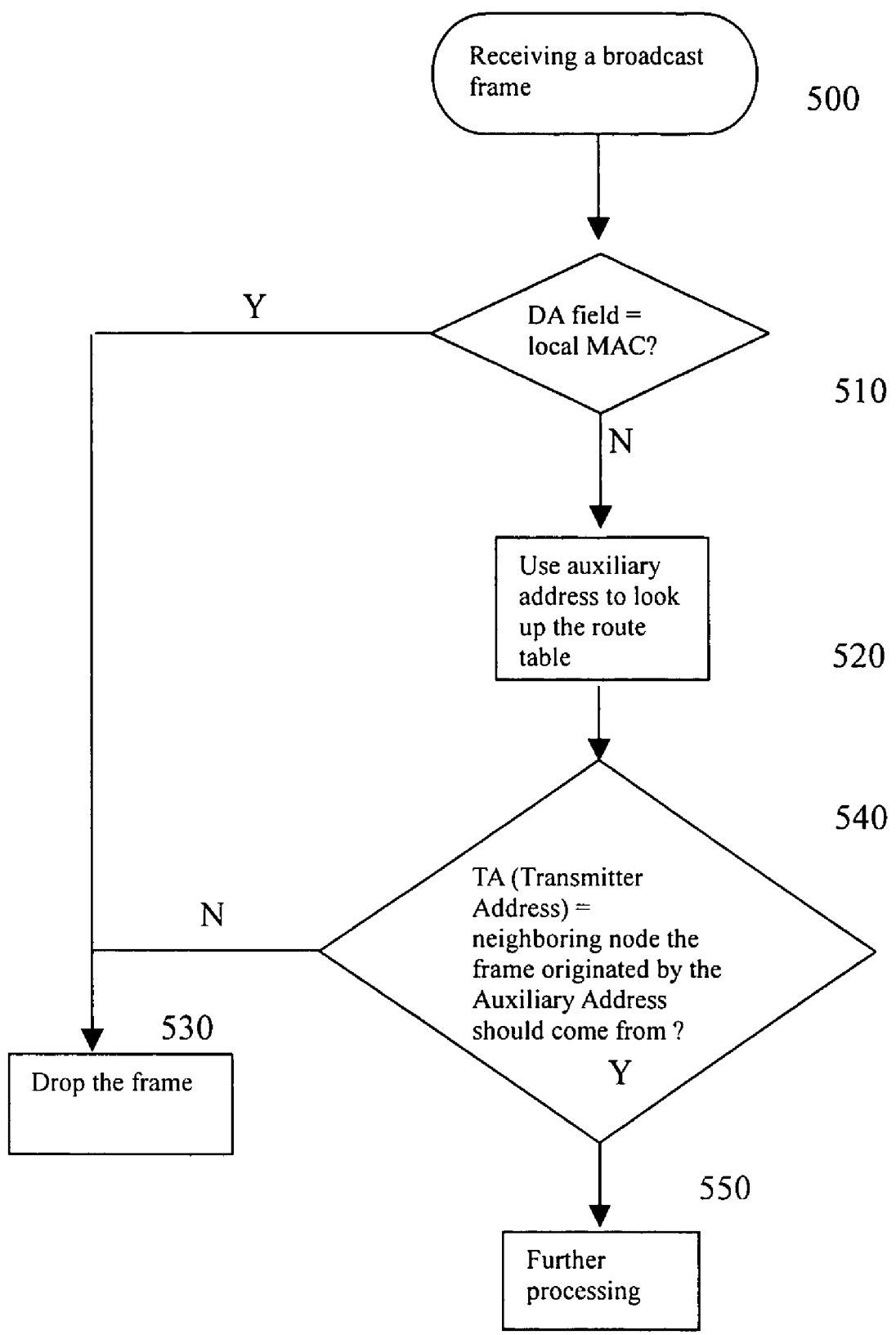
FIG. 5 describes the processing flow chart on receiving a broadcast frame

FIG. 5 illustrates the processing flow chart on receiving a broadcast frame. In step 500, a wireless transport device receives a broadcast frame. The wireless transport device will determine whether or not the DA filed is the same as the local MAC address of this device (510). If positive, the wireless transport device drops the frame because it is an echoed frame (step 530). Otherwise, it uses Auxiliary Address to verify whether this frame is received through the correct neighbor, namely in step 520, to look up the route table. Subsequently, in step 540, the wireless transport device determines whether the TA address is the neighboring node the frame should come from. If positive, then the wireless transport device relays the frame or performs other process (550), otherwise, drops the frame (step 530).

To maintain the client station membership among all transport devices requires transport devices to perform the "client membership announcement". To reduce the traffic generated for the announcement, the present invention can embed the announcement of a newly associated wireless client of a transport device onto a broadcast frame the client generates, if it is the first frame from the client system. This is useful because if the client is running common network layer protocols, the first frame is likely to be a broadcast frame. For example, in an IP network, the first frame from a newly booted up station usually is a broadcast frame containing either DHCP request or an ARP request. The client membership announcement in these cases can be piggybacked into the broadcast frame which saves the introduction of the membership announcement frames for this new client. This can be achieved by using one of the flags in WINnet header in FIG. 4. If the "membership announcement" flag is set, all the received transport devices will record the association between the client (which is identified by the Address 4: SA, or Source Address) and the originator (which is identified by the Auxiliary Address, as described earlier).

In case there are more than one edge device connecting the wireless network to a wired network, the present invention is the election of the primary device among the edge devices to enable only one edge device to relay broadcast traffic across the wired and wireless network. Without the primary device being identified, no edge device can broadcast packets across wire and wireless border. Any edge device has to periodically broadcast its edge function capability for others to use. It also send the announcement whether there is any function change on this device, such as it is not an edge device any more or it realizes it should not or should serve as the primary edge device. The election can be performed at wireless network. A ballot frame with priority of the edge device and the whether the device is the primary edge device is periodically announced to all devices. The edge device with the lowest value of (priority+MAC address) is elected as the primary device. On receiving the announcement, if the local device realizes it should be the primary edge device for a group, but the other device has claimed the title, it has to generate a new announcement to correct it. On receiving this message, the original device should update the world once again with an announcement.

It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A method of wireless communication, comprising:
   carrying an identify information of a first device in a broadcast frames, wherein identify information includes a name or an address of a device, and wherein said broadcast frame is MAC frame, wherein a WITnet header is added inside the MAC frame to carry said identify information for a device; and
   allowing a second device to determine to receive said broadcast frames from said first device by said identify information;
   wherein said first device and said second device are coupled each other thereby constructing a segment of a wireless communication network.

2. The method of claim 1, wherein said first device includes an originator device or a relaying neighboring device, wherein said second device includes a wireless transport device.

3. The method of claim 2, wherein said originator device includes a wireless transport device or a portable device, wherein said relaying neighboring device includes a wireless transport device.

4. The method of claim 1, further comprising the steps of:
   allowing said second device to calculate a table that contains a list of said first device;
   accepting said broadcast frames from said first while said first device is listed in said table.

5. The method of claim 2, further comprising the steps of:
   allowing said wireless transport device to calculate a table that contains a list of said originator device and said relaying neighboring device;
   accepting said broadcast frames from said neighboring device while said neighboring device is listed in said table.

6. The method of claim 1, further comprising the steps of:
   allowing said second device to calculate a table that contains a list of said first devices;
   dropping said broadcast frames from said first device while the said first device is not listed in said table as the relaying device.

7. The method of claim 2, further comprising the steps of:
   allowing said wireless transport device to calculate a table that contains a list of said originator and said relaying neighboring device;
   dropping said broadcast frames from said neighboring device while said neighboring device is not listed in said table as the relaying device.

8. The method of claim 1, wherein said identify information of said first device as part of said broadcast frames to facilitate the filtering on said broadcast frames.

9. The method of claim 1, further comprising the steps of: adding address information of a previous hop from where said broadcast frame comes into a transmitted frame while relaying said broadcast frame.

10. The method of claim 9, further comprising the steps of: dropping said broadcast frame while said wireless transport device receives said broadcast frame with said previous hop field containing said address of said wireless transport device's own.

11. The method of claim 1, further comprising the steps of: embedding announcement information of a newly associated wireless client of a transport device into said broadcast frame.

12. The method of claim 1, further comprising the steps of: enabling only one edge device of multiple edge devices to relay broadcast traffic across a wired and a wireless network among said multiple edge devices connecting said wireless network to said wired network.

13. The method of claim 1, wherein said broadcast frame in said WITnet is a WDS frame with Destination Address Field being used to carry previous-hop identify information.

14. The method of claim 1, wherein said WITnet adopts several innovative schemes to prevent said second wireless transport devices from receiving and processing duplicate broadcast frames.

15. A wireless communication network, comprising:
    at least one edge device coupled to a wired network;
    one or more wireless transport device coupled to said edge device via a wireless network;
    at least one mobile device coupled to said wireless transport device via said wireless network;
    wherein said wireless transport device carries an identify information in a broadcast frame, wherein said broadcast frame is MAC frame, wherein a WITnet header is added inside the MAC frame to carry said identify information; and said identify information allowing said wireless transport device to determine to receive a broadcast frames from a neighboring device, and wherein said identify information includes a name or an address of a device.

16. The network of claim 15, wherein said wireless transport device calculates a table that contains a list of an originator devices and an associated relaying neighboring device.

17. The network of claim 15, wherein said wireless transport device accepts said broadcast frames from said neighboring device while said table includes the information of said neighboring device.

18. The network of claim 15, wherein said wireless transport device drops said broadcast frames from said neighboring device while said neighboring device said originator is not listed in said table of said wireless transport device.

19. The network of claim 15, wherein said identify information as part of said broadcast frames to facilitate the filtering on said broadcast frames.

20. The network of claim 15, wherein an address information of a previous hop from where said broadcast frame comes into a transmitted frame while relaying said broadcast frame.

21. The network of claim 15, wherein only one of said at least one edge device enables to relay broadcast traffic across a wired and a wireless network among said at least one edge devices connecting said wireless network to said wired network.

22. The network of claim 15, wherein said broadcast frame in said WITnet is a WDS frame with Destination Address Field being used to carry previous-hop device identify information.

23. The network of claim 15, wherein said WITnet adopts several innovative schemes to prevent said wireless transport devices from receiving and processing duplicate broadcast frames.

24. A method of wireless communication, comprising:
receiving a broadcast frame by a wireless transport device;
determine whether a DA (destination address) filed is a MAC's own address;
looking up a route table by using of an auxiliary address while said DA filed is not said MAC's own address, otherwise, dropping said broadcast frame;
determining whether a neighboring node said broadcast frame coming from is the relaying node identified by said auxiliary address in a WITnet header, while positive, said wireless transport device processing said broadcast frame, otherwise, dropping said broadcast frame.

* * * * *